United States Patent [19]

Nakatomi et al.

[11] 4,256,072
[45] Mar. 17, 1981

[54] SPARK TIMING CONTROL METHOD AND DEVICE

[75] Inventors: Takayoshi Nakatomi; Keiji Aoki, both of Susono, Japan

[73] Assignee: Toyota Jidosha Kogyo Kabushiki Kaisha, Aichi, Japan

[21] Appl. No.: 926,728

[22] Filed: Jul. 21, 1978

[30] Foreign Application Priority Data

Jul. 22, 1977 [JP] Japan .................................. 52-87346

[51] Int. Cl.³ .............................................. F02P 5/04
[52] U.S. Cl. .................................. 123/415; 123/417; 123/423
[58] Field of Search ......... 123/32 EA, 117 R, 117 D, 123/32 EB, 32 EC

[56] References Cited

U.S. PATENT DOCUMENTS

| 3,939,811 | 2/1976 | Sasayama | 123/117 D X |
| 3,969,614 | 7/1976 | Moyer et al. | 123/117 D X |
| 4,052,967 | 10/1977 | Colling et al. | 123/117 D |
| 4,066,968 | 1/1978 | Guipaud | 123/148 E X |
| 4,112,879 | 9/1978 | Assenheimer et al. | 123/32 EH X |

Primary Examiner—Tony M. Argenbright
Attorney, Agent, or Firm—Toren, McGeady and Stanger

[57] ABSTRACT

An optimum spark timing angle, i.e. spark advance or spark advance angle, is computed for an automobile internal combustion engine by a computing unit on the basis of at least two operational parameters of an engine. An intake manifold vacuum signal during an intake stroke of one cylinder of the engine is stored or delayed a given time, and then an intake manifold vacuum signal and a rotational speed signal of the engine are delivered to a computing unit which computes a spark advance for the specific cylinder.

13 Claims, 26 Drawing Figures

SPARK TIMING CONTROL METHOD AND DEVICE

BACKGROUND OF THE INVENTION

1. Field of the Invention

This invention relates to spark timing control methods and spark timing control devices for internal combustion engines, and more particularly to spark timing control methods and devices in which a computing unit computes an optimum spark advance, or spark advance angle, on the basis of at least two operational parameters of an internal combustion engine, e.g., intake manifold vacuum and speed of the engine.

2. Description of the Prior Art

The spark advance angle of an engine may be controlled on the basis of the engine speed and the engine load (the volumetric efficiency of a mixture charge in a cylinder). Of these, the load on the engine is generally detected by measuring the engine's intake manifold vacuum. However, the engine's crank shaft rotates during the given time lag that occurs between the moment an intake manifold vacuum sensor detects an intake manifold vacuum, and the moment a computing unit computes a spark advance angle for a cylinder. It follows that the computing unit does not compute a spark advance angle for the cylinder whose actual volumetric efficiency is measured, but for the succeeding cylinder.

When the load on a cylinder, i.e, the volumetric efficiency of a mixture charge in a cylinder, is low, the spark advance angle should be increased. On the other hand, when the volumetric efficiency of a mixture charge is high, then the spark advance should be reduced. Accordingly, when the load is varied substantially, for instance, during the acceleration, the intake manifold vacuum is immediately increased commensurate to the opening of the throttle valve in the car's carburetor. As a result the spark advance angle for a cylinder of a high volumetric efficiency is allotted to a cylinder of a low volumetric efficiency. Hence, the ignition timing or spark timing used for the cylinder in question is retarded from a desired optimum timing, and the duration of combustion in the cylinder is shortened. This leads to lower torque.

Proposals have been made for an exhaust gas recirculation system which recirculates part of the exhaust gases into an intake system to suppress nitrogen oxides contained in the engine's gases. The spark timing would be controlled by the flow rate of exhaust gases being recirculated. When the exhaust gas recirculation is subjected to a simple on-off control, the spark timing during exhaust-gas recirculation would be advanced as compared with when exhaust-gas recirculation is interrupted. In such a system, when the exhaust gas recirculation is turned "on" from an "off" condition, i.e. when an exhaust gas recirculating valve opens a recirculating passage, the spark timing is immediately advanced. However, even this system produces a given time lag when the recirculating exhaust gases are delivered from the exhaust gas recirculating valve in a recirculating passage to an intake valve in the engine. On the other hand, a time lag exists in terms of crank rotation from the time the cylinder in which recirculating exhaust gases are first filled completes a compression stroke until this cylinder reaches the spark timing condition. Accordingly, the spark timing for a cylinder which is not filled with recirculating exhaust gases is advanced. Hence the cylinder is over-advanced. This results in an increase in the amount of harmful constituents in the exhaust gases.

SUMMARY OF THE INVENTION

It is an object of the present invention to provide a spark timing, or ignition timing, control method and a spark timing control device for use in an engine, in which a computing unit is adapted to compute a spark advance angle for a cylinder, based on the volumetric efficiency of a mixture charge, or an intake manifold vacuum on an intake stroke of a cylinder.

It is another object of the present invention to provide a spark timing control method and a spark timing control device for use in an engine incorporating an exhaust gas recirculating system which advances the spark timing for a cylinder, in which recirculating exhaust gases are actually filled, or a spark timing which brings the timing back to the original for a cylinder in which the filling of recirculating gas is actually interrupted.

DESCRIPTION OF THE PREFERRED EMBODIMENTS

The present invention is described in detail with reference to the accompanying drawings, in which spark timing control devices are used in a four-cylinder internal combustion engine.

Figure 1:
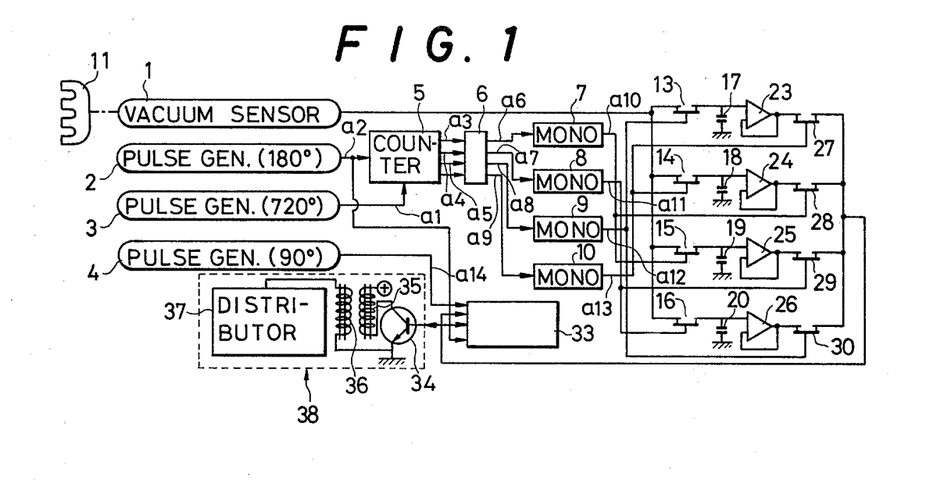
FIG. 1 is a schematic drawing showing a spark timing control device which computes a spark advance angle analogically and which embodies features of the invention.

In FIG. 1, an intake manifold vacuum sensor 1 generates an analog voltage representing an intake manifold vacuum from an intake manifold 11. Three pulse generators 2, 3 and 4 generate one pulse for every rotation of a crank shaft through angles of 180°, 720° and 90°, respectively. A first cylinder C1, a second cylinder C2, a third cylinder C3, and a fourth cylinder C4, are ignited in the sequence C1, C2, C3, and C4. For convenience of description, the first cylinder C1 is taken as a reference cylinder. The pulse generator 2 generates one pulse, every 180°, specifically every time a piston in the first cylinder C1 reaches a top dead center or a bottom dead center. The pulse generator 3 generates one pulse, every time the piston in the first cylinder C1 reaches a bottom dead center in its intake stroke, i.e. every 720°. The pulse generator 4 generates one pulse, every time the piston in the first cylinder reaches a top dead center, bottom dead center and middle point between the top and bottom dead centers (at 90° intervals).

An output signal from the pulse generator 2 is delivered to an input terminal of a binary counter 5, while an output signal from the pulse generator 3 is delivered to a reset terminal of the counter 5. The counter 5 has a four digit binary output. Each output bit of the counter 5 is connected to each input terminal of a decoder 6. Each output terminal of the decoder 6 is connected to respective input terminals; of four monostable multivibrators 7, 8, 9, 10.

Figure 4:
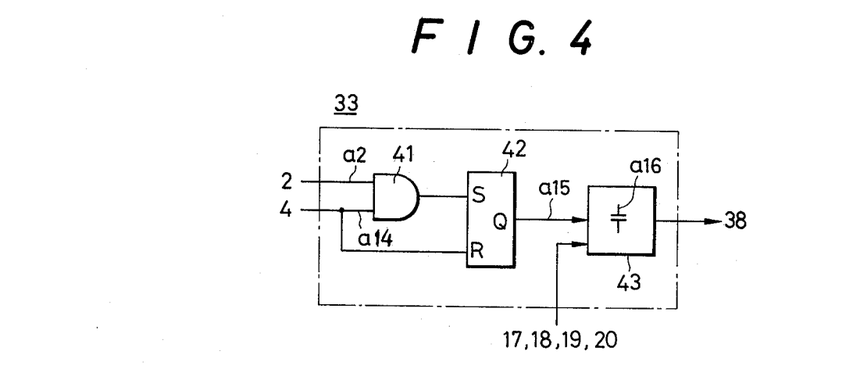
FIG. 4 is a schematic drawing illustrating details of the analog type electronic spark-timing computing unit shown in FIG. 1.

An output of the intake manifold vacuum sensor 1 is delivered via switching transistors 13, 14, 15 or 16 to capacitors 17, 18, 19 or 20 that serve as voltage storage elements. Each terminal voltage in capacitors 17, 18, 19, 20 is delivered via respective switching transistors 27, 28, 29, and 30 to analog type electronic spark-timing computing unit 33 whose details are shown in FIG. 4. The output of the monostable multivibrator 7 actuates the bases of switching transistors 15 and 28, the output of the monostable multivibrator 8 controls the bases of the switching transistors 16, 29, the output terminal of the monostable multivibrator 9 is connected to the bases of switching transistors 13 and 30, and the output terminal of the monostable multivibrator 10 is coupled to the bases of switching transistors 14 and 27.

The analog type electronic spark-timing computing unit 33 receives signals from the pulse generators 2 and 4. The output terminal of the analog type electronic spark-timing computing unit 33 is connected to a base of a power transistor 34 in ignition means 38. The power transistor 34 turns an energizing current for a primary coil 35 of an ignition coil on and off. Secondary coil 36 is connected to a distributor 37, while the distributor 37 distributes an ignition current to the spark plugs in the cylinders.

The process by which an intake manifold vacuum signal is delivered to the analog type electronic spark-timing computing unit 33 may be appreciated by reference to the pulse diagram shown in FIGS. 2A to 2M. Here, time t is represented by the abscissas, while a1 to a13 represent voltage levels at points indicated in FIG. 1.

Figure 2A:
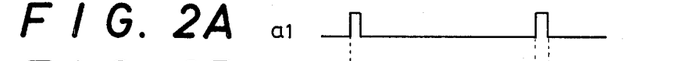
FIGS. 2A to 2M and 3A to 3F are graphs illustrative of the operation and advantages of the device of FIG. 1.
Figure 2B:
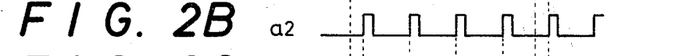

At the time t1, the counter 5 is cleared by a pulse a1 delivered from the pulse generator 3 to the reset terminal. The pulse generator 2 should deliver a pulse to an input terminal of the counter 5 at the same time as the pulse generator 3. However, in fact, due to a phase difference, a pulse a2 from the pulse generator 2 reaches the input terminal of the counter 5 at a time t2 which is a short time after the pulse a1 from the pulse generator 2.

Figure 2C:
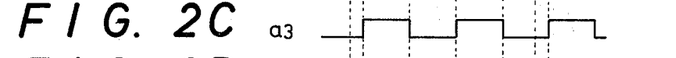
Figure 2D:
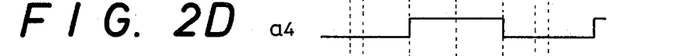
Figure 2E:
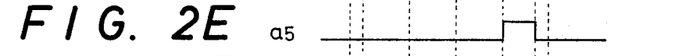

In this manner, the binary counter 5 counts pulses delivered by the pulse generator 2 from the time t1 on. As stated, the counter 5 has a four digit binary output. At the time t2 when the first pulse is delivered, the least significant binary digit at the output of the counter 5, i.e., at a3 only, goes high. The four digit binary output now reads 0001. At a time t3 when the second pulse is delivered, a second significant binary digit, i.e., a4 only, at the output of the counter 5 goes to a high level and the output reads 0010. In this manner, the counter 5 counts the pulses which are delivered from the pulse generator 2 up to the fourth pulse. The counter is then cleared again by a pulse a1 from the pulse generator 3.

Figure 2F:
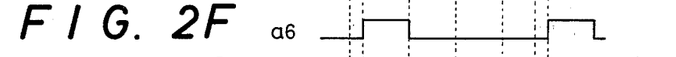
Figure 2G:
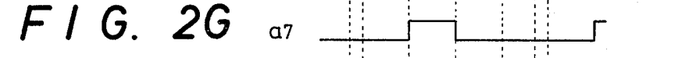
Figure 2H:
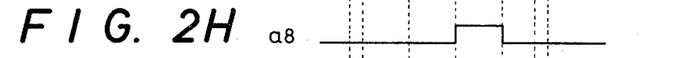
Figure 2I:
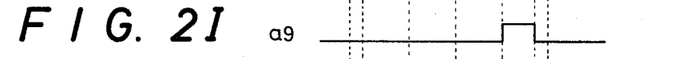

The decoder 6 generates a high level voltage at one of four output terminals commensurate to a count of the counter 5. More particularly, when the count of counter 5 is 1 (decimal digit), a6 only goes to a high level, and when the count of counter 5 is 4 (decimal digit), only a9 goes to a high level.

Figure 2J:
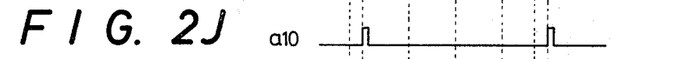
Figure 2K:
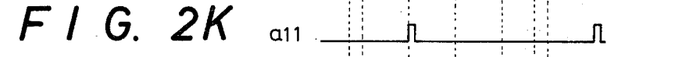
Figure 2L:
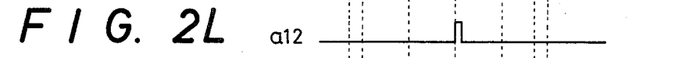
Figure 2M:
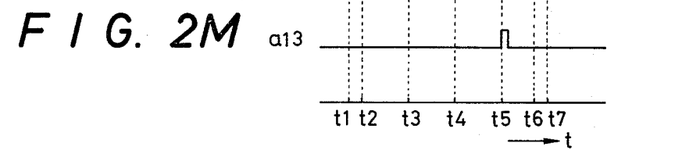

The outputs of the monostable multivibrators 7 to 10 are maintained at a high level only for a given period of time for each pulse delivered from the decoder 6. For example, the output a10 of the monostable multivibrator 7 is maintained at a high level for a given period of time beginning with the time t2, and the output a13 of the monostable multivibrator 10 is maintained at a high level for a given period of time beginning with the time t5. In fact, at the time t2, the first cylinder C1 is undergoing its intake stroke, and at the time t5, the fourth cylinder C4 is in its intake stroke.

A pulse from the monostable multivibrator 7 to the base of the switching transistor 15 causes the switching transistor 15 to conduct for a given period beginning with the time t2. For a given period of time, in which the switching transistor 15 is maintained conductive, the voltage at the sensor 1 is applied across the capacitor 19. Hence the terminal voltage of the capacitor 19 is almost instantaneously built up to a voltage level which represents an analog of the intake manifold vacuum as sensed by the intake manifold vacuum sensor 1. The capacitor 19 voltage is maintained at this level. In other words, starting at the time t2, the capacitor 19 establishes a value corresponding to the intake manifold vacuum.

The time t3 lags the time t2 180° in terms of the rotational angle of the crank shaft. Accordingly, the first cylinder C1 in the engine is going through a compression stroke, while the second cylinder C2 goes through an intake stroke. The switching transistors 16 and 29 conduct for a period of time beginning with the time t3 in response to pulses being delivered by the monostable multivibrator 8 to the bases of switching transistors 16 and 29. For a given period of time, in which switching transistor 16 is maintained conductive, the voltage across the capacitor 20 builds up to a voltage level which is an analog of intake manifold vacuum at that time. The capacitor 20 receives the analog vacuum signal from the intake manifold vacuum sensor 1 and maintains its voltage. In addition, for a given period of time, during which the switching transistor 29 conducts a signal corresponding to the voltage across the capacitor 19, and hence representing the intake manifold vacuum, is delivered via buffer amplifier 25 and switching transistor 29 to the analog type electronic spark-timing computing unit 33.

In a similar manner, when the second to fourth cylinders go through their intake strokes, the capacitors 20, 17, and 18 effectively store the momentary intake manifold vacuums as terminal voltages. On a compression stroke, after rotation of the crank shaft through an angle of 180° from the moment of storage, the stored terminal voltage is entered in the analog electronic spark-timing computing unit 33.

Figure 3A:
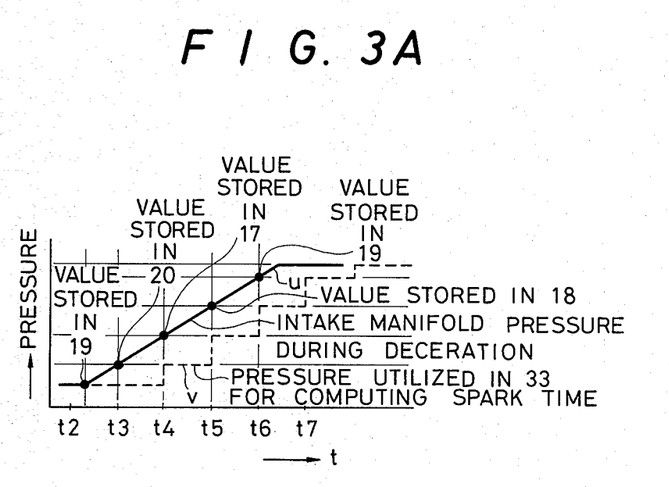
Figure 3B:
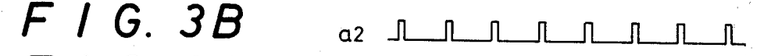
Figure 3C:
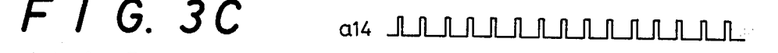
Figure 3D:
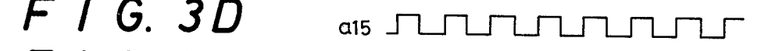
Figure 3E:
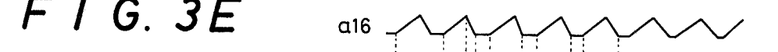

Details of the operation and structure of the analog electronic spark-timing computing unit 33 appear in FIGS. 3A to 3F and 4. FIG. 3A shows an intake manifold vacuum with a transient increase. The time progress (t) is represented by the abscissas in FIGS. 3A to 3F. FIG. 3B is the same as FIG. 2B. Curves a14 to a16 in FIGS. 3C to 3E represent voltage levels at the positions indicated in FIG. 4. It should be noted that the times t2, t3, t4, t5, and t7 in FIGS. 3A to 3F correspond to those in FIGS. 2A to 2M.

As shown in FIG. 4, the output of the pulse generator 2 appears at an AND circuit 41. The output of the pulse generator 4 is delivered to the AND circuit 41 as well as to the reset terminal R of an RS flip flop 42. The output of the AND circuit 41 is applied to the set terminal S of the RS flip flop 42. An output of the Q terminal of the RS flip flop 42 is applied to an output circuit 43. A voltage signal is also delivered to the output circuit 43 from the capacitors 18, 19, 20 via switching transistors 27, 28, 29 and 30. The output of the circuit 43 is passed to a base of the power transistor 34 in ignition means 38.

At the time t3, the outputs of the pulse generators 2 and 4 are high so that the RS flip flop 42 is set. The time t3, as described, is the time when the switching transistor 29 is rendered conductive and when the first cylinder C1 is in its intake stroke. At this point, the voltage stored across the capacitor 19 is delivered to the analog electronic spark-timing computing unit 33. In addition, the time t3 is the time when the second cylinder C2 passes through an intake stroke and its intake manifold vacuum is stored in the capacitor 20.

After the time t3, i.e., from the time when RS flip flop 42 is set, a capacitor in the output portion 43 is charged at a given time constant. This is shown by the curve a16.

At the time t31, the output of the pulse generator 4 goes high, a2 is low, the RS flip flop 42 is reset, and the charging of the capacitor in the output portion 43 is interrupted. See curve a16 in FIG. 3E. The capacitor within the output portion 43 now discharges. The discharge time is substantially proportional to the voltage signal delivered from the capacitor 19 in the output portion 43 at the time t3. In other words, at the time t32, the voltage across the capacitor in the output portion 43 effectively reaches zero (a16). The time interval from t31 to t32 is increased or decreased with the increase in intake manifold vacuum at the time t2 during the intake stroke of cylinder C1.

At the time t32, the output portion 43 renders the power transistor 34 non-conductive. Thus, at the time t32, a large current is produced in the secondary coil 36, so that a spark plug in the first cylinder C1 is fired.

In a similar manner, spark plugs in the second, third, and fourth cylinders are fired at time t42, t52, t72, in association with terminal voltages stored across capacitors 20, 17, and 18, respectively.

As shown by broken lines in connection with an intake manifold vacuum in FIG. 3A, the analog type electronic spark-timing computing unit 33 computes a spark advance angle, based on an intake manifold vacuum 180° earlier in terms of the rotational angle of a crank shaft. This provides an optimum spark advance angle commensurate to an actual volumetric efficiency of a mixture in a cylinder. The dot-dash line shown in connection with the spark advance angle in FIG. 3F represents a spark advance angle of the prior art device.

Figure 3F:
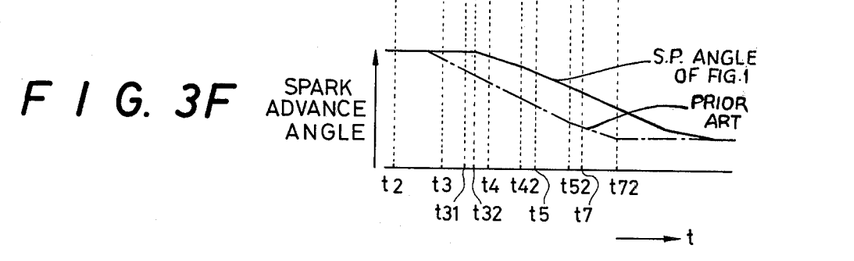

FIG. 3F shows the spark advance angle x produced by the embodiment disclosed in FIG. 1 as well as a conventional spark advance angle y. In the embodiment of FIG. 1, a negative pressure in the intake manifold at the time t2 of a cylinder's, e.g. the first cylinder's, intake stroke forms the input data for computation of the spark time for the given cylinder. This produces the relationship x in FIG. 3F. In FIG. 1, the computation occurs during the compression stroke of the first cylinder, i.e. from time t3 to time t4. This contrasts with prior art devices where the input data for an output between t3 and t4 is taken during the compression stroke from t3 to t4, and where the result is that shown by y in FIG. 3F.

FIG. 3A shows the relation between time t and the actual negative pressure u in the intake manifold. The broken lines show the negative intake pressure v which is ultimately processed during the compression strokes, e.g. between times t3 and t4 in the first cylinder, as a result of the intake pressure being stored in the capacitors 17 to 20.

Figure 5:
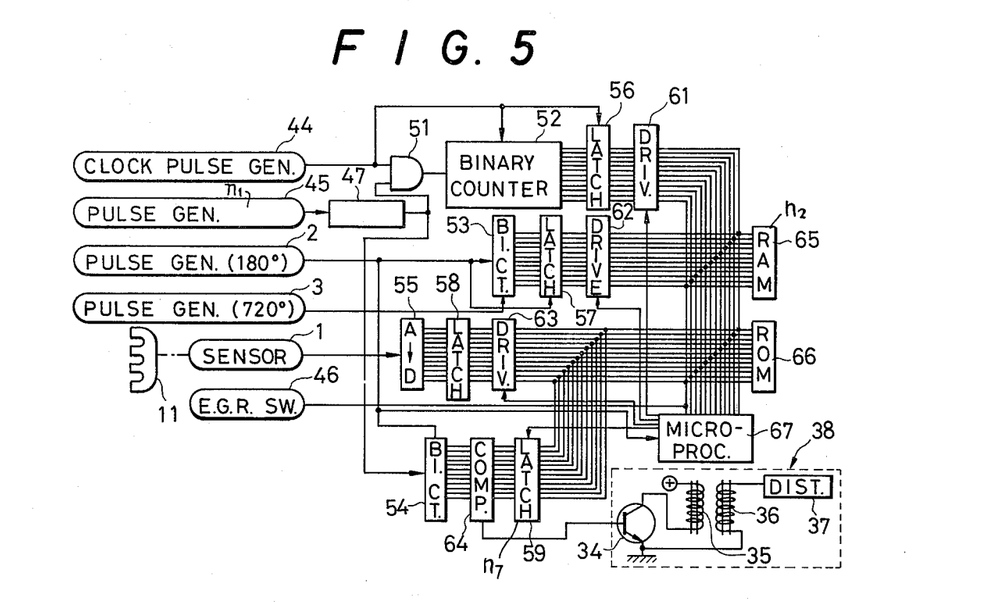
FIG. 5 is a schematic drawing showing a spark timing control device in which a micro-processor computes a spark advance angle, and which embodies features of the invention.

In FIG. 5, a device according to the present invention digitally computes a spark advance angle by means of a microprocessor serving as a computing unit. Here a clock pulse generator 44 generates a series of pulses having widths of 3 ms. A pulse generator 45 generates a pulse for every rotation of a crank shaft. Reference numerals 1, 2, and 3, correspond to those in FIG. 1. An EGR, i.e. exhaust gas recirculation switch 46 is turned on and delivers an ON signal, when an exhaust gas recirculating passage is open and recirculation takes place. The EGR switch is turned off when recirculation does not take place. A frequency multiplier 47 generates an output having a frequency ten times as high as that of its input. The device further includes an AND circuit 51. Binary counters 52, 53, and 54, A-D converter 55, latches 56, 57, 58 and 59, (e.g. Toshiba models TC 4042P), bus drivers, i.e. buffers 61, 62 and 63 (e.g. Toshiba models TC 5012P), a digital signal comparator 64, a random access memory 65, hereinafter referred to as RAM, and, a read-only memory 66, hereinafter referred to as ROM. A microprocessor 67 may process bits up to 12 bits. A microprocessor suitable for this embodiment is a Model TLCS-12A manufactured by Toshiba in Japan.

The output of the clock pulse generator 44 is delivered to an input terminal of the AND circuit 51, the reset terminal of the counter 52, and the control terminal of a latch 56.

The output of the pulse generator 45 appears at the frequency multiplier 47, and the output of the frequency multiplier 47 is applied to input terminals of the AND circuit 51 and counter 54. The output of the pulse generator 2 passes to the input terminal of the counter 53, a control terminal of the latch 57, an input terminal of micro-processor 67, and the reset terminal of the counter 54. The output of the pulse generator 3 is delivered to the reset terminal of the counter 53. The output of the intake manifold vacuum sensor 1 is delivered to the A-D converter 55, twelve bit outputs of the A-D converter 55 are delivered to the latch 58, and twelve bit outputs of the counters 52, 53 are delivered to latches 56, 57, respectively. Twelve bit outputs of the counter 54 are delivered to the digital signal comparator 64, and twelve bit outputs of the latches 56, 57, 58 are delivered to bus drivers 61, 62, 63, respectively. Twelve output bits of the bus drivers 61, 62, 63, twelve input/output bits of the ROM 66, twelve input/output bits of the micro-processor, and twelve input bits of the latch 59 are connected with each other via twelve buses. The micro-processor 67 delivers a control signal to the drivers 61, 62, 63 and the control terminal of the latch 59. The EGR switch 46 is connected to a bus of the highest order bit. An output of the digital signal comparator 64 is connected to a base of a power amplifier 34 in the ignition means similar to that shown in FIG. 1.

The frequency of an output pulse of the pulse generator 45 is multiplied ten times, and then delivered to the AND circuit 51. One pulse is generated at an output terminal of the frequency multiplier 47 at every rotation of a crank shaft through an angle of 0.1°. The counter 52 is cleared by the rising edge of a pulse from the clock pulse generator 44, and thereafter the counter 52 counts the number of output pulses from the AND circuit 51. In other words, the count of counter 52 represents the angle of rotation of the crank shaft over a 2 ms. period, i.e. the momentary r.p.m. of the engine. Then, the clock pulse generator 44 generates a pulse, the count of counter 52 is stored in the latch 56, and the counter 52 is cleared. The counter 52 then counts the number of output pulses of the AND circuit 51.

The counter 53 is cleared by a pulse from the pulse generator 3, and thereafter the counter 53 counts the number of pulses from the pulse generator 2. The pulse generator 2 generates one pulse every 180° of rotation of a crank shaft. When the count of counter 53 reaches 4, (i.e., every 720°), the counter 53 is again cleared by a pulse from the pulse generator 3. Hence the count of counter 53 may be considered indicative of the cylinder which passes through an intake stroke at that time. In other words, when the count of counter 53 is 1 (decimal digit), the first cylinder C1 is on the intake stroke, and when the count of counter 53 is 4 (decimal digit), the fourth cylinder C4 is on the intake stroke. When a pulse is delivered from the pulse generator 2 to a control terminal of the latch 57, the count of counter 53 is stored in the latch 57.

An analog voltage of the intake manifold vacuum sensor 1 is converted into a twelve bit digital signal by the A-D converter 55. The twelve bit digital signal is then stored in the latch 58.

The micro-processor 67 drives the bus driver 62 in response to an interruption signal from the pulse generator 2, thereby detecting the count of counter 53 at that time. When the first cylinder C1 is on the intake stroke, the count of counter 53 is 1. Then, the micro-processor designates an address No. 1 of the RAM, while driving the bus driver 63. In this manner, data from the intake manifold vacuum sensor is stored in address No. 1 of RAM 65.

Figure 6:
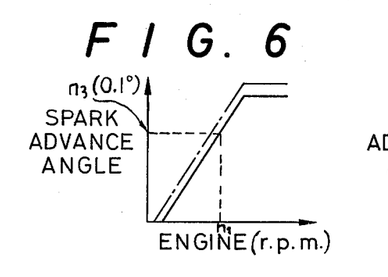
FIGS. 6 and 7 are graphs showing data stored in a ROM of FIG. 5.
Figure 7:
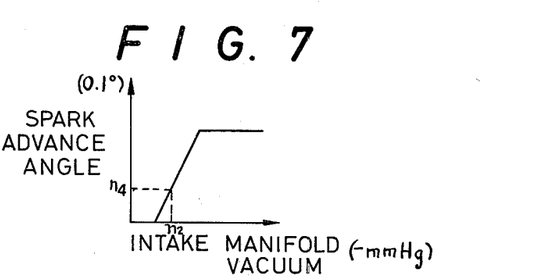

An optimum spark advance angle commensurate to the r.p.m. of the engine and an optimum spark advance angle commensurate with an intake manifold vacuum are hard wired in ROM 66. FIGS. 6 and 7 show the relationship between spark advance angle, engine r.p.m. and intake manifold vacuum by solid lines.

When the micro-processor 67 reaches the time to compute a spark advance angle for the first cylinder C1, then the micro-processor 67 drives the driver 51, thereby providing data n1 indicative of the r.p.m. of the engine and obtains from the address No. 1 of RAM 65 data n2 concerning the intake manifold vacuum on the intake stroke of the first cylinder C1. The micro-processor 67 detects an optimum spark advance angle stored in ROM 66 as shown in FIGS. 6 and 7. This provides the sum n5=n3+n4 of the spark advance angles which depend on the data n3, n4 obtained. Then, the micro-processor 67 subtracts the aforesaid sum n5 from 180° to obtain 180−n5=n6, and then multiplies the difference value n6 ten times to obtain 10n6=n7. The final value n7 is stored in the latch 59. The reason for subtracting the sum from 180° is that, a reference point is replaced by a bottom dead center of a piston in each cylinder on a compression stroke, in contrast to the fact that the spark advance angles in the plots of FIGS. 6 and 7 are based on the top dead center of a piston on an expansion stroke of each cylinder. The reason for multiplying a difference value ten times is that one pulse is delivered from the frequency multiplier 47 to the counter 54 at every rotation of a crank shaft through an angle of 0.1°, in contrast to the fact that spark advance angles in the plots in FIGS. 6 and 7 are represented in units of 1°.

On the other hand, the counter 54 is cleared according to a pulse from the pulse generator 2, when the piston associated therewith is at its bottom dead center during the compression stroke of the first cylinder C1. Thereafter, the counter 54 receives one pulse from the frequency multiplier 47 at every rotation of a crank shaft through an angle of 0.1°. The counter 54 now counts the pulses thus received. In other words, the count of counter 54 represents the displacement of a piston from the bottom dead center in terms of a crank shaft rotation at angle in units of 0.1°, on a compression stroke of the first cylinder.

When the count in counter 54 equals the value stored in the latch 59, the output voltages of the digital signal comparator 64 is low, and the power transistor 34 remains non-conductive. As a result, the spark plug in the first cylinder C1 is fired. The spark advance angle at this time, i.e. the rotational angle of a crank shaft, which is advanced from the rotational angle of a crank shaft, when the piston remains at the top dead center on an expansion stroke of the first cylinder C1 is coincident with an optimum spark advance angle, which the micro-processor 67 has determined, based on spark advance angles shown in FIGS. 6 and 7.

The operation similar to that of the first cylinder is carried out for the second cylinder C2 and fourth cylinder C4.

It suffices that addresses up to No. 2 are provided for the RAM 65 as memory addresses. It further suffices that intake manifold vacuum data on an intake stroke of the first cylinder C1 and third cylinder C3 are stored at the address No. 1 of RAM 65, and intake manifold data on an intake stroke of the second cylinder C2 and fourth cylinder C4 be stored at the address No. 2 of RAM 65.

This is because there is a difference of 360° in crank shaft rotational angle between the first cylinder C1 and the third cylinder C3, so that there is no overlap between the storage period of the intake manifold vacuum information of the first cylinder C1 and a storage period of an intake manifold vacuum information of the third cylinder C3.

When part of the exhaust gases are supplied to an intake system, an ON signal is delivered from the EGR switch 46 to the bus line of the highest bit. This ON signal is stored at the same address as that of the intake manifold vacuum signal. During recirculation of the exhaust, the spark advance angle optimum to the r.p.m. of an engine is advanced as shown by a one-point-chain line in FIG. 6. The ON-signal from the EGR switch 46 and the intake manifold vacuum signal from the intake manifold vacuum sensor 1 on an intake stroke of the cylinder are stored at the same address in RAM 65. Thus, when the micro-processor 67 computes a spark advance angle of the cylinder, the micro-processor 67 picks up the above two data from RAM 65 for processing.

Meanwhile, when the EGR switch is used, the highest bit at the address of RAM 65 should be provided for data from the EGR switch 46. Hence a digital signal indicating the intake manifold vacuum should be less than 11 bits.

Figure 8:
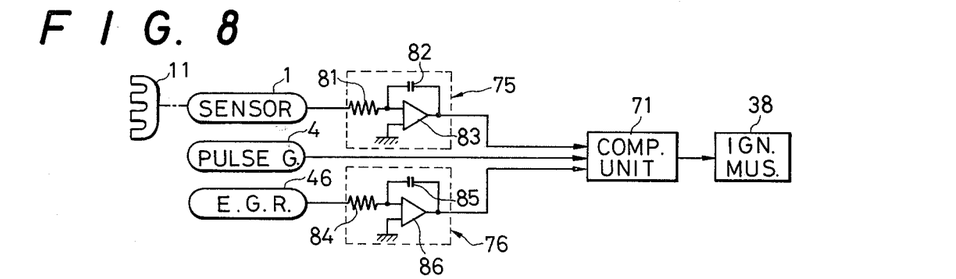
FIGS. 8 and 9 are schematic drawings of other embodiments of the invention.

FIG. 8 shows still another embodiment of the invention. Here a delay circuit 75 delays the output of the intake manifold vacuum sensor 1 and supplies it to an analog electronic spark-timing computing unit 71. A delay circuit 76 delays the EGR switch 46 and supplies it to an analog electronic computing unit 71. The pulse generator 4 generates one pulse at every 90° of rotation of the crank shaft and supplies these pulses to the analog electronic computing unit 71. The latter actuates the ignition means 38 which is the same as that shown in FIG. 1.

Delay circuits 75, and 76 are in the form of integrators. The delay circuit 75 is composed of a resistor 81, a capacitor 82 and an operational amplifier 83. In the similar manner, the delay circuit 76 includes a resistor 84, a capacitor 85, and an operational amplifier 86.

An intake manifold vacuum signal detected by the intake manifold vacuum sensor 1, when the first cylinder C1 remains on an intake stroke, is delayed a given time by the delay circuit 75, and delivered to the analog electronic spark timing computing unit 71. When the analog electronic computing unit 71 processes the intake manifold vacuum signal for computing a spark advance angle for the first cylinder C1 is the same as the time when the intake manifold vacuum signal reaches the analog electric spark time computing unit 33 in FIG. 1.

The analog electronic spark timing computing unit 71 determines a spark advance angle for the first cylinder C1, on the basis of the intake manifold vacuum signal from the intake manifold vacuum sensor 1, the rotational speed signal from the pulse generator 4, and a piston position signal, and actuates the ignition means 38. In this manner a spark advance angle for the first cylinder C1 is determined on the basis of the intake manifold vacuum on the intake stroke of the first cylinder C1.

The signal from the EGR switch 46, also is delayed a given time by the delay circuit 76, as in the case of the delay circuit 75, and then delivered to the analog type electronic computing unit 71. The timing, when a signal detected by the EGR switch 46 on the intake stroke of the first cylinder C1 reaches the analog type EGR electronic spark timing computing unit 71, is the same as the time when the analog type electronic spark timing computing unit 71 should process the EGR signal for computing a spark advance angle for the first cylinder C1. In this manner, a spark advance angle is not advanced or delayed immediately upon the commencement or or interruption of exhaust gas recirculation. Rather, the spark advance begins with the cylinder, in which recirculating exhaust gases are actually filled.

The spark advance angles for the second cylinder C2 to the fourth cylinder C4 may be computed in a manner similar to that of the first cylinder C1.

According to another embodiment, data concerning the exhaust gas recirculation may be detected not only digitally in the form of an ON-signal or OFF signal. The flow rate of recirculating exhaust gases supplied to an intake system may also be detected by the sensor, and then a signal therefrom may be delivered to the delay circuit 76.

The embodiment of FIG. 8 provides advantages of reduced number of elements, and an arrangement simpler than those of the embodiments shown in FIGS. 1 and 5.

Figure 9:
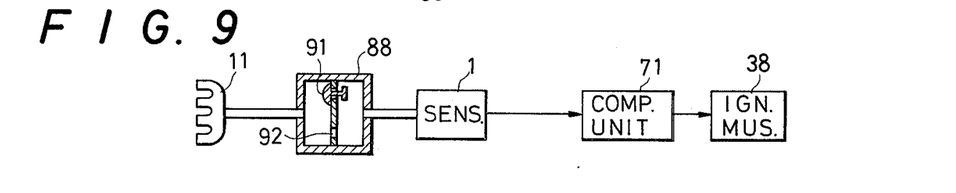

FIG. 9 shows still another embodiment of the invention. According to the embodiment of FIG. 8, the electric delay circuit 75 is provided between the intake manifold vacuum sensor 1 and an input terminal of the analog type electronic spark-timing computing unit 71, whereas in the embodiment of FIG. 9, a vacuum delay valve 88 is provided between the intake manifold 11 and the intake manifold vacuum sensor 1. The vacuum delay valve 88 consists of a check valve 91 and an orifice 92, as well known. Thus, a variation in intake manifold vacuum is delayed a given time by the vacuum delay valve 88, then detected by the intake manifold vacuum sensor 1, and delivered to the analog electronic computing unit 71. The time when the intake manifold vacuum delayed by means of the vacuum delay valve 88 is detected by the intake manifold vacuum sensor 1, is coincident with the time, when the analog type electronic spark timing computing unit 71 should process the intake manifold vacuum signal for computing a spark advance angle for the cylinder on an intake stroke, on the basis of the intake manifold vacuum.

As is apparent from the foregoing description of the spark timing control method and device according to the present invention a spark advance angle for a cylinder is computed, based on an intake manifold vacuum or EGR signal when the cylinder remains on its intake stroke. In this manner, even when an intake manifold vacuum is varied to a large extent, or exhaust gas recirculation is commenced or interrupted, ignition may be effected for a cylinder at a spark-advance angle optimum to a volumetric efficiency of a mixture charge for the cylinder in question.

Although the present invention has been described with respect to specific details of certain embodiments thereof, it is not intended that such details be limitations upon the scope of the invention except insofar as set forth in the following claims.

What is claimed is:

1. A spark timing control method for an automobile internal combustion engine having an intake manifold and a plurality of cylinders as well as a crank shaft, comprising the steps of:

storing or delaying, an intake vacuum manifold signal on an intake stroke of a specific cylinder of the engine;

delivering to a computing unit the intake manifold vacuum signal;

delivering a rotational speed signal to the computing unit;

computing a spark advance angle for the specific cylinder with the computing unit, setting a spark advance angle for said specific cylinder;

the step of storing or delaying occuring at least for the time till the computing unit computes the spark advance angle for the specific cylinder.

2. A spark timing control device for use in an internal combustion engine having an intake manifold and a plurality of cylinders, comprising:

an intake manifold vacuum sensor for detecting an intake manifold vacuum as a first parameter of said engine;

storage means coupled to the sensor for storing an output of said intake manifold vacuum sensor;

rotational speed detecting means for detecting the rotational speed as a second operational parameter of said engine;

a computing unit coupled to the storage means and the speed detecting means for computing a spark advance angle for said specific cylinder on the basis of the intake manifold vacuum data on an intake stroke of said specific cylinder in said engine, and on the basis of engine rotational speed from said rotational speed detecting means;

said storage means being arranged to store the output of the sensor from the time of the intake stroke of the specific cylinder until the computing unit computes the spark advance angle for that cylinder.

3. A spark timing control device for use in an internal combustion engine, comprising:
   an intake manifold vacuum sensor for detecting an intake manifold vacuum and producing a signal;
   delay means coupled to the sensor for delaying the signal of said intake manifold vacuum sensor;
   rotational speed detecting means for detecting the rotational speed of said engine;
   a computing unit coupled to the delay means and the detecting means for computing a spark advance angle for the specific cylinder on the basis of engine rotational speed and the intake manifold vacuum signal on an intake stroke of said specific cylinder of said engine, said delay means applying the signal from said sensor to the computing unit until said computing unit computes the spark advance angle.

4. A spark timing control device for use in an internal combustion engine forming a manifold vacuum and having a plurality of cylinders, comprising:
   a vacuum sensor for detecting a vacuum;
   a delay valve for delivering a variation in intake manifold vacuum to said vacuum sensor;
   rotational speed detecting means for detecting the rotational speed of said engine;
   a computing unit for computing a spark advance angle for a specific cylinder in response to intake manifold vacuum information on an intake stroke of said specific cylinder, said information being received from said delay valve in addition to the engine rotational speed from said rotational speed detecting means;
   said delay valve delaying the receipt of said vacuum information by said computing unit from the time of the intake stroke of the specific cylinder to the time the computing unit computes the spark advance angle.

5. A spark timing control method for an internal combustion engine having an exhaust gas recirculation system, wherein an optimum spark advance angle is computed by means of a computing unit in association with at least three operational parameters of the engine, including whether or not exhaust gas recirculation is occurring, the intake manifold vacuum and the rotational speed of the engine, comprising the steps of:
   storing or delaying an exhaust gas recirculating signal representing whether or not exhaust gas recirculation is carried out on an intake stroke of a specific cylinder of said engine;
   storing or delaying an intake manifold vacuum signal on an intake stroke of said specific cylinder;
   feeding to a computing unit an exhaust gas recirculating signal, and the intake manifold vacuum signal which has been stored or delayed, and an engine rotational speed signal, computing a spark advance angle for said specific cylinder with the computing unit on the basis of whether or not recirculating exhaust gases are actually contained in said specific cylinder, the intake manifold vacuum on an intake stroke of said specific cylinder, and the engine rotational speed;
   said step of stroing or delaying occurring from the time of the signal on the intake stroke of the specific cylinder to the time the spark advance angle is computed by the computing unit.

6. For an automobile engine having a plurality of cyclically varying cylinders and a crankshaft as well as an intake manifold under vacuum pressure and a spark device in each cylinder, an ignition timing control comprising:
   an operating arrangement including indicating means and a sensor;
   said indicating means functioning to respond to the engine to produce an indication of the cyclical condition of one of the cylinders;
   said sensor functioning to respond to the intake manifold vacuum to produce a vacuum signal corresponding to the vacuum;
   timer means for delaying the output of the sensor;
   computing means coupled to said indicating means and said sensor for computing and producing an ignition signal at a time in the cycle of one of the cylinders on the basis of the manifold vacuum signal;
   said timer means delaying the output of the sensor from the time the sensor produces the vacuum signal to the time the computing means computes the ignition signal.

7. A control as in claim 6, wherein the control responds to an engine with cylinders performing intake, compression, power, and exhaust strokes in succession, and wherein said operating arrangement includes control means coupled to said sensing means and responsive to said indicating means for sensing the output of said sensing means during the intake stroke of the one of the cylinders, said computing means responding to the response of the timer means and producing the ignition signal during the succeeding compression stroke of the one of the cylinders.

8. A control as in claim 7, wherein said timer means includes first delay means for delaying the sensed signal of the sensor until the compression stroke, and said computer means includes second delay means for delaying the ignition signal on the basis of the manifold vacuum sensed during the intake stroke.

9. A control as in claim 8, wherein said first delay means includes a storage element coupled to said sensing means and a gate coupled to said indicating means.

10. A control as in claim 8, wherein said first delay means includes a random access memory and a read only memory, and said computing means includes a microprocessor.

11. A control as in claim 8, wherein said first delay means includes an operational integrator coupled to said sensor.

12. A control as in claim 8, wherein said sensor include a mechanical pipe connectable to the manifold, and said first delay means includes a check valve.

13. A control as in claim 7, wherein the engine includes a gas recirculation system and said operational arrangement includes a gas sensor for sensing the operation of said gas recirculation system, said timer means responding to the gas sensor during the intake stroke of the one of the cylinders.

* * * * *